United States Patent
Ishii (10) Patent No.: US 8,681,754 B2
(45) Date of Patent: Mar. 25, 2014

(54) WIRELESS CONTROL SYSTEM

(75) Inventor: Yosuke Ishii, Musashino (JP)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 1424 days.

(21) Appl. No.: 12/138,794

(22) Filed: Jun. 13, 2008

(65) Prior Publication Data

US 2009/0080394 A1 Mar. 26, 2009

(30) Foreign Application Priority Data

Sep. 20, 2007 (JP) ................................ 2007-243617

(51) Int. Cl.
H04W 4/00 (2009.01)
(52) U.S. Cl.
USPC ........................................ 370/338; 370/328
(58) Field of Classification Search
USPC .......................................................... 370/338
See application file for complete search history.

(56) References Cited

U.S. PATENT DOCUMENTS

2003/0151513 A1* 8/2003 Herrmann et al. .......... 340/573.1
2004/0193546 A1* 9/2004 Tokutani et al. ................ 705/59
2007/0076686 A1* 4/2007 Song ............................. 370/351

FOREIGN PATENT DOCUMENTS

JP 2005-515695 A 5/2005
WO 03/061175 7/2003

* cited by examiner

Primary Examiner — Shripal Khajuria
(74) Attorney, Agent, or Firm — Westerman, Hattori, Daniels & Adrian, LLP (57) ABSTRACT

The invention realizes a wireless control system capable of reducing loads on a wireless network and gateway nodes and improving reliability of the system. The wireless control system for collecting data from a plurality of wireless nodes constituting a wireless network to a supervisory node via gateway nodes, wherein said each gateway node and said each wireless node have group IDs assigned thereto in advance and said each wireless node selects a route having the most excellent communication quality of routes leading to the gateway nodes having the same group ID as a self-node and transmits data to the selected route.

5 Claims, 11 Drawing Sheets

WIRELESS CONTROL SYSTEM

FIELD OF THE INVENTION

The invention relates to a wireless control system, in particular to a wireless control system for reducing a load on a wireless network, and loads on gateway nodes, thereby improving reliability of the wireless control system.

BACKGROUND OF THE INVENTION

There has been recently proposed a wireless control system utilizing wireless communication, for example, in order to make up or support a process control system in an industrial automation. Since a conventional wireless control system is made up by a wired network, there arises a problem that sensors for measuring a temperature, flow rate and so forth can not be disposed at the optimum positions in a plant due to limitation of a communication distance, limitation of leading of the wiring around the sensors, thereby deteriorating control accuracy. Accordingly, the invention has been developed to solve such a problem.

There is the following prior art reference relating to the conventional wireless control system.

[Patent Document] WO2003/061175 (JP 2005-515695A)

Figure 9:
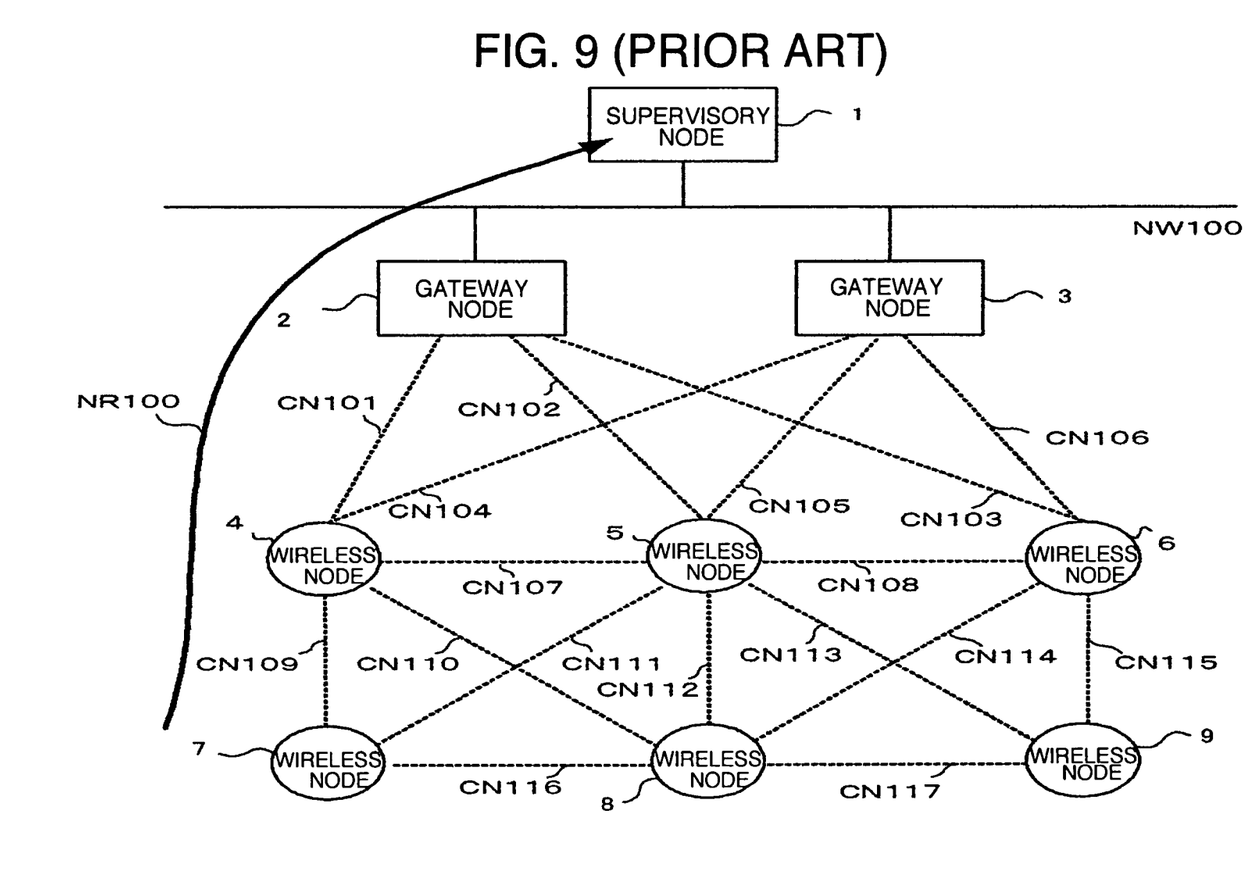
FIG. 9 is a block diagram showing a configuration of an example of a conventional wireless control system.

FIG. 9 is a block diagram showing a configuration of an embodiment of a conventional wireless control system. In FIG. 9, a supervisory node 1 is mutually connected to gateway nodes 2 and 3 via a network NW100. The gateway node 2 is connected to a wireless node 4 via a wireless network circuit (hereinafter referred to as wireless circuit) CN101, to a wireless node 5 via a wireless circuit CN102 and to a wireless node 6 via a wireless circuit CN103.

The gateway node 3 is connected to the wireless node 4 via a wireless circuit CN104, to the wireless node 5 via a wireless circuit CN105 and to the wireless node 6 via a wireless circuit CN106.

The wireless node 4 is connected to the wireless node 5 via a wireless circuit CN107, to a wireless node 7 via a wireless circuit CN109 and to a wireless node 8 via a wireless circuit CN110.

The wireless node 5 is connected to the wireless node 7 via a wireless circuit CN111, to the wireless node 8 via a wireless circuit CN112, to a wireless node 9 via a wireless circuit CN113 and to the wireless node 6 via a wireless circuit CN108. The wireless node 6 is connected to the wireless node 8 via a wireless circuit CN114 and to the wireless node 9 via a wireless circuit CN115.

The wireless node 8 is connected to the wireless node 7 via a wireless circuit CN116 and to the wireless node 9 via a wireless circuit CN117. In such a manner, the wireless nodes 4 to 9 form a mesh-type multihop wireless network. In FIG. 9, there is shown an operation of data communication NR100 wherein the wireless node 7 transmits data to the supervisory node 1 via the gateway node 2.

In the wireless control system in FIG. 9, the supervisory node 1 collects and stores therein measurement data measured by the wireless nodes 4 to 9 and grasps the measurement data. The gateway nodes 2 and 3 have a communication function to implement communication mainly with each wireless node and the supervisory node 1. The wireless nodes 4 to 9 are installed on a plant, and form a wireless sensor network, whereby they have a sensor function to measure physical quantity such as a temperature and flow rate, and a wireless communication function to implement wireless transmission of these measurement data, and they transfer data received from other wireless nodes.

Meanwhile, it may be configured that the supervisory node 1 transfers collected measurement data to a controller, not shown, and the controller calculates control data for operating and controlling a control instrument such as a valve, regulating valve, and so forth, not shown, in order to converge the measurement data in a prescribed target value, and operates and controls the control instrument based on the control data.

Figure 10:
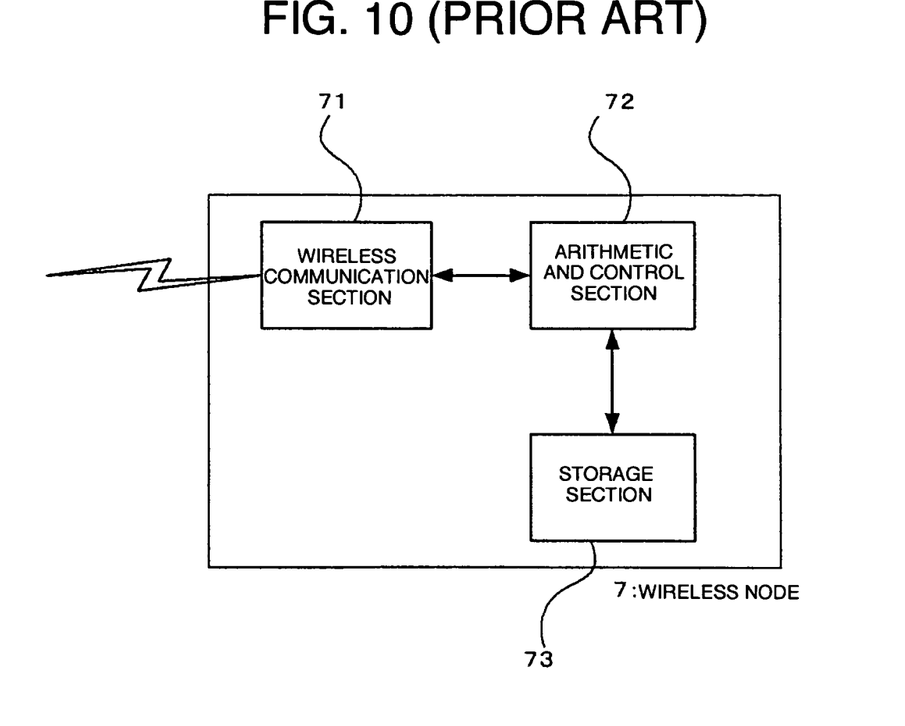
FIG. 10 is a block diagram showing a configuration of an example of a wireless communication function of a wireless node 7 in FIG. 9.

FIG. 10 is a block diagram showing a configuration of an example of a wireless communication function of the wireless node 7 in FIG. 9. In FIG. 10, a wireless communication section 71 is connected to an arithmetic and control section 72, and the arithmetic and control section 72 is connected to a storage section 73. The wireless communication section 71 implements wireless communication mainly between itself and other wireless nodes and gateway nodes 2 and 3. The arithmetic and control section 72 controls operations of each section. There are stored in the storage section 73 a program for operating the wireless nodes, information of route leading from a self-node to the gateway nodes 2 and 3, (hereinafter referred to route information) and so forth. The wireless nodes 4 to 6, 8 and 9 have the same configurations as that of the wireless node 7.

Meanwhile, it is supposed here that the wireless nodes 4 to 9 grasp in advance route information for transferring data to the gateway nodes 2 and 3 by implementing address/name resolution, and searching a route or setting route information in advance on each wireless node. Further, it is supposed that the gateway nodes 2 and 3 grasp in advance route information leading to the supervisory node 1.

Figure 11:
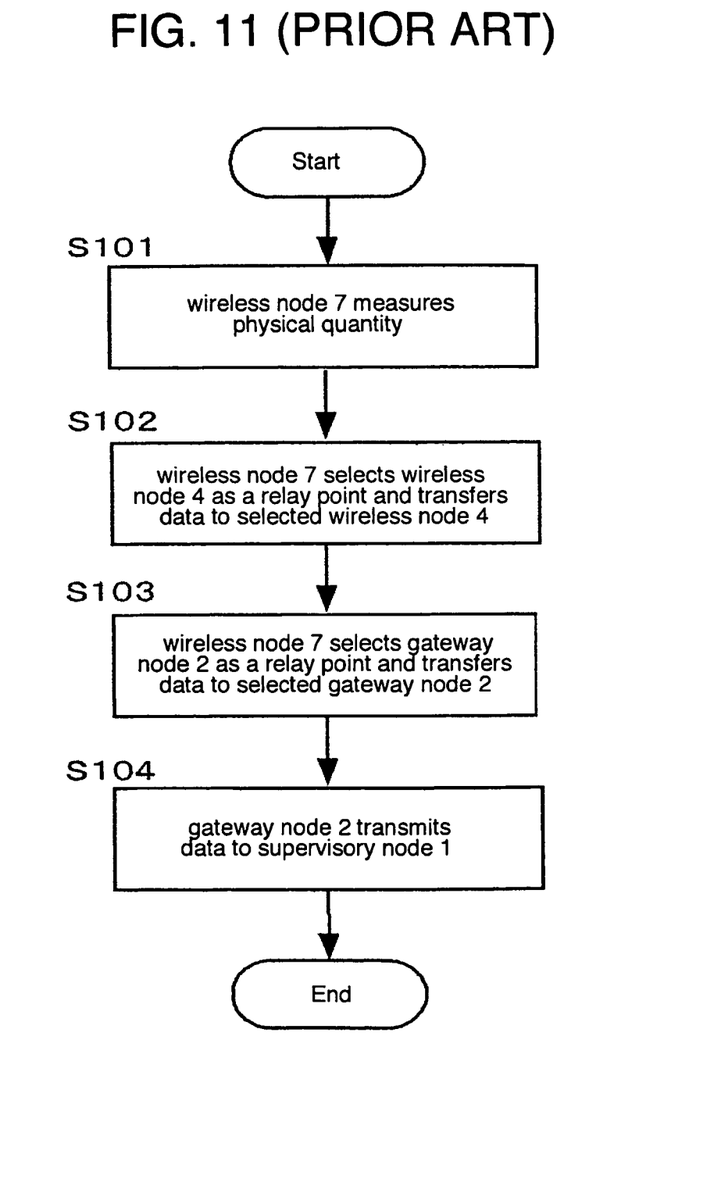
FIG. 11 is a flow chart for explaining an operation of the conventional wireless control system.

An operation of the conventional wireless control system is described with reference to a flow chart in FIG. 11. First, in step S101, when the arithmetic and control section 72 of the gateway node 7 reads and executes the program stored in the storage section 73, thereby controlling a sensor to measure physical quantity such as a flow rate, temperature and so forth, and stores therein measured data in the storage section 73. Meanwhile, the operation of the arithmetic and control section 72 of the wireless node 7 to read and execute the program stored in the storage section 73 to control each section is also applied to other wireless nodes, and hence the operations of those of other wireless nodes are omitted.

In step S102, the arithmetic and control section 72 of the wireless 7 selects the wireless node or gateway node serving as a relay point for transferring the measurement data to the supervisory node 1 based on route information stored in advance in the storage section 73, and transmits the measurement data of physical quantity such as the flow rate, temperature, and so forth to the selected wireless node or gateway node. For example, the arithmetic and control section 72 of the wireless 7 selects the wireless node 4 as a relay point based on the route information stored in advance in the storage section 73, and transmits the measurement data to the selected wireless node 4 via the wireless circuit CN109.

In step S103, the wireless node 4 selects the wireless node or gateway node serving as a relay point for transferring the measurement data to the supervisory node 1 based on route information stored in advance in a storage section, not shown, and transmits measurement data received from the wireless node 7 to the selected wireless node or gateway node. For example, the wireless node polarization film 4 selects the gateway node 2 and transmits the measurement data acquired from the wireless node 7 to the gateway node 2.

In step S104, the gateway node 2 transmits measurement data received from the wireless node 4 to the supervisory node 1 via the network NW100. That is, the wireless node 7 transmits the measurement data to the supervisory node 1 via the wireless node 4 and gateway node 2 as shown in the data communication NR100 in FIG. 9.

The supervisory node 1 stores therein data transferred from the gateway node 2, and grasps measurement data measured by the wireless node 7. Since the supervisory node 1 collects and stores therein measurement data likewise from the other wireless nodes, it can grasp an operation condition of the plant. Further, it may be configured that the supervisory node 1 transfers measurement data collected from any wireless node to a controller, not shown, and the controller converges the measurement data in a target value in which a measurement value is previously set, thereby controlling prescribed control instruments such as a valve, heater and so forth, not shown so that the plant can be operated optimally.

As a result, the supervisory node 1 can grasp the operation condition of the plant by collecting and storing the measurement data from each wireless node, thereby supporting the optimum operation of the plant.

Meanwhile, when structuring such a wireless control system, it is necessary that each wireless node grasps the number of the gateway nodes, installing positions of gateway nodes and network information such as an IP address, and so forth.

Consequently, it is carried out that network information is acquired via a wireless network by setting network information in advance on each wireless node or utilizing address/name resolution mechanism.

Further, since the gateway node collects data from many wireless nodes, a communication load on the gateway node increases, so that the performance of the system is liable to decrease. Accordingly, it is carried out that the communication load on the gateway node is dispersed by installing a plurality of gateway nodes so as to decrease the communication load on the gateway node.

Still further, it is carried out that a gateway node for urgency dedicated for alarm data having high level of urgency is installed, and the wireless node selects a route via the gateway node for urgency based on a name inherent in the gateway node for urgency, and identification information such as ID and so forth, thereby transmitting alarm data to the selected route.

However, according to a method of setting in advance network information on each wireless node, when the change or extension of configuration of the system such as newly installation of a gateway node or wireless node or the change of address is carried out, network information set on each wireless node has to be changed, causing a problem in terms of extension and flexibility of the system.

Further, according to a method of acquiring network information via a wireless network utilizing an address/name resolution mechanism, each wireless node acquires address information of the gateway node from a wireless node having a directory service function for the address/name resolution mechanism via the wireless circuit, resulting in the increase of traffic of the wireless network, causing a problem that the performance of the entire system decreases.

Still further, even in a method of dispersing a communication load by installing a plurality of gateway nodes, there is a likelihood that the communication load on the gateway node is biased depending on the installing position of the wireless node or gateway node, causing a problem that the load on the gateway node 22 can not be controlled.

More still further, in the case of installing a gateway node for urgency, every time the configuration of the system is changed owing to the change of the name or ID of the gateway node, and so forth, newly installation and removal of the gateway node, the wireless node has to acquire identification information of the gateway node which has been changed or newly installed, resulting in the increase of traffic in the same manner as the case of utilizing the forgoing address/name resolution mechanism, so that the performance of the entire system decreases.

Depending on the installing position of the wireless node, radio disturbance will occur if there exists an obstacle, so that wireless communication is liable to get into an unstable state and the communication load on the gateway node is biased, causing a problem that the performance of the entire system decreases.

SUMMARY OF THE INVENTION

The invention has been developed to solve the foregoing problems, and it is an object of the invention to realize a wireless control system capable of reducing loads on a wireless network and gateway nodes and improving reliability of the system.

To solve the foregoing problems, according to the first aspect of the invention, the wireless control system for transmitting data from a plurality of wireless nodes constituting a wireless network to a supervisory node via gateway nodes is characterized in that said each gateway node and said each wireless node have group IDs assigned thereto in advance, and said each wireless node selects a route having the most excellent communication quality of routes leading to the gateway nodes having the same group ID as a self-node and transmits data to the selected route.

According to the second aspect of the invention, the wireless control system according to the first aspect of the invention is characterized in that said each gateway node transmits GW information notice data including at least a group ID of the self-node to said each wireless node, said each wireless node has route information leading from the self-node to said each gateway node and route cost information serving as an index representing communication quality leading from the self-node to a destination node, wherein said each wireless node selects a route having the most excellent communication quality of the routs leading to the gateway nodes having the same group ID as the self-node based on the group ID of the self-node, the GW information notice data, the route information and the route cost information, and transmits data to the gateway nodes or other wireless nodes.

According to the third aspect of the invention, the wireless control system according to the first aspect of the invention is characterized in that said each wireless node stores therein the group IDs of said each gateway node based on the GW information notice data, and transmits the GW information notice data to other wireless nodes.

According to the fourth aspect of the invention, the wireless control system according to the first aspect of the invention is characterized in that said each wireless node selects a plurality of routs having an excellent communication quality of the routes leading to the gateway nodes having the same group ID as the self-node, and transmits data to the selected plurality of routes.

According to the fifth aspect of the invention, the wireless control system according to the first aspect of the invention is characterized in that said each wireless node comprises a storage section for storing therein first route information leading from the self-node to said each gateway node, route cost information, and the group IDs of the self-node and said each gateway node, a wireless communication section for implementing wireless communication, and an arithmetic and control section for transferring the GW information notice data to other wireless nodes, storing at least the group IDs of said each gateway node in the storage section based on the GW information notice data, selecting a route having the most excellent communication quality of the routs leading to the gateway nodes having the same group ID as the self-node based on the route information, the route cost information and the GW information notice data, and transmitting data acquired from the self-node or data received from other wireless nodes based on the selected route to the gateway nodes or other wireless nodes.

According to the sixth aspect of the invention, the wireless control system according to the first aspect of the invention is characterized in that said each gateway node comprises a storage section for storing therein a second route information leading from each wireless node to the supervisory node for collecting data from said each wireless node via said each gateway node and the group ID of the self-node, a communication section for implementing data communication by at least either wireless communication or wired communication, and an arithmetic and control section for transmitting the GW information notice data to said each wireless node and transferring the data received from said each wireless node based on the second route information to the supervisory node.

According to the first to sixth aspect of the inventions, the loads on the wireless network and gateway nodes can be reduced, thereby improving reliability of the system.

PREFERRED EMBODIMENT OF THE INVENTION

Figure 1:
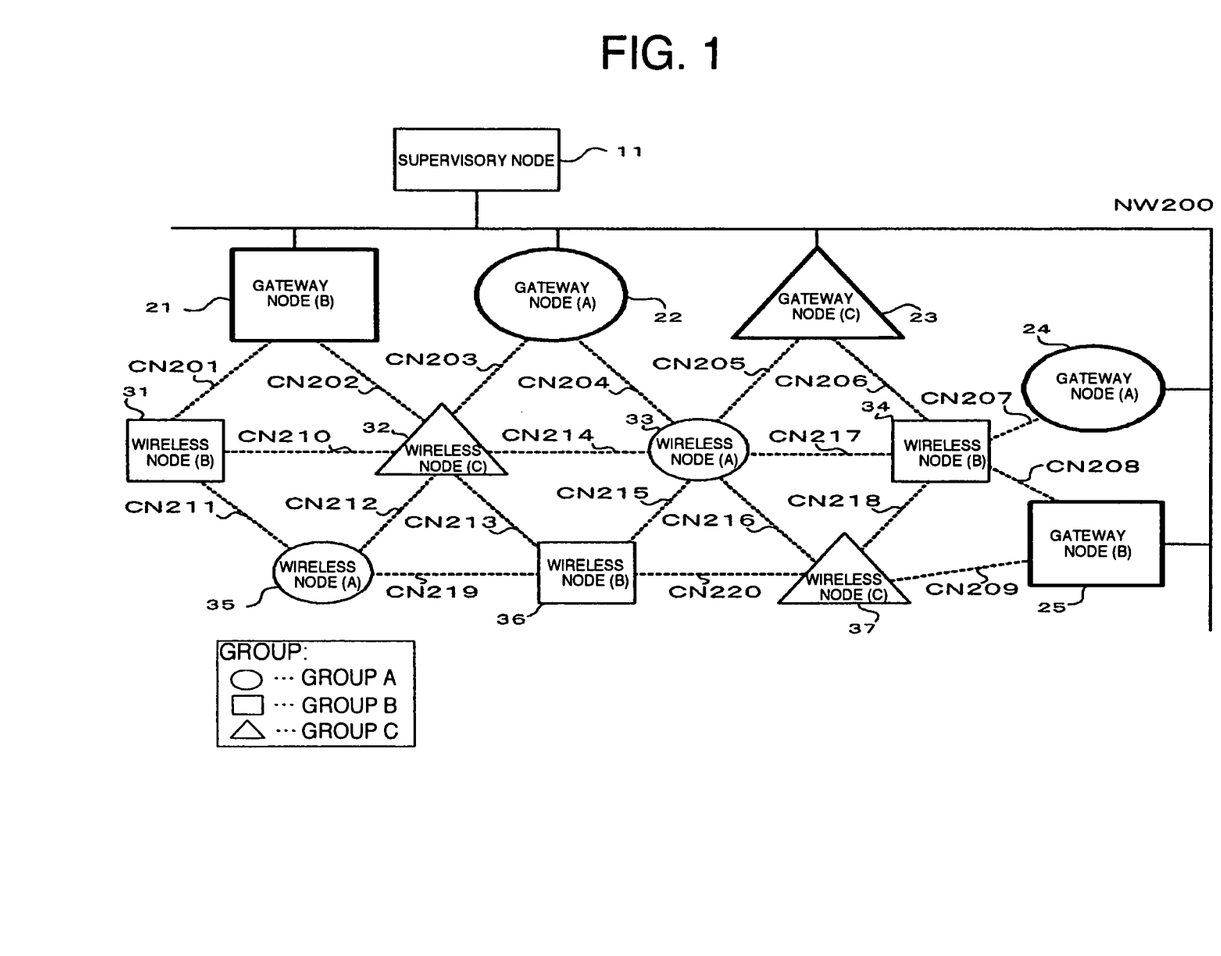
FIG. 1 is a block diagram showing a configuration of an embodiment of a wireless control system according to the invention.

FIG. 1 is a block diagram showing a configuration of an embodiment of a wireless control system according to the invention. In FIG. 1, a supervisory node 11 is mutually connected to gateway nodes 21 to 25 via a network NW 200. The gateway node 21 is connected to a wireless node 31 via a wireless circuit CN201 and to a wireless node 32 via a wireless circuit CN202.

The gateway node 22 is connected to the wireless node 32 via a wireless circuit CN203 and to a wireless node 33 via a wireless circuit CN204. The gateway node 23 is connected to the wireless node 33 via a wireless circuit CN205 and to a wireless node 34 via a wireless circuit CN206.

The gateway node 24 is connected to the wireless node 34 via a wireless circuit CN207. The gateway node 25 is connected to the wireless node 34 via a wireless circuit CN208 and to a wireless node 37 via a wireless circuit CN209.

The wireless node 31 is connected to the wireless node 32 via a wireless circuit CN210 and to a wireless node 35 via a wireless circuit CN211. The wireless node 32 is connected to the wireless node 35 via a wireless circuit CN212, to a wireless node 36 via a wireless circuit CN213 and to the wireless node 33 via a wireless circuit CN214.

The wireless node 33 is connected to the wireless node 36 via a wireless circuit CN215, to a wireless node 37 via a wireless circuit CN216 and to the wireless node 34 via a wireless circuit CN217.

The wireless node 34 is connected to the wireless node 37 via a wireless circuit CN218. Further, the wireless node 36 is connected to the wireless node 35 via a wireless circuit CN219 and to the wireless node 37 via a wireless circuit CN220.

In the wireless control system in FIG. 1, the supervisory node 11 forms a supervisory network, whereby it collects and stores therein data such as measurement data measured by the wireless nodes 31 to 37, and so forth each having a sensor function, and grasps the measurement data. The gateway nodes 21 to 25 have a communication function to implement communication mainly with the wireless nodes 31 to 37, the supervisory node 11, and so forth. The wireless nodes 31 to 37 are installed on a plant, and form a wireless sensor network, whereby they have a sensor function to measure physical quantity such as a temperature and flow rate, and so forth and a wireless communication function to implement wireless transmission of these measurement data, and they transfer data received from other wireless nodes. The gateways 21 to 25 are represented by bold lines in FIG. 1.

For brevity, it is supported that the wireless nodes 31 to 37 form a mesh-type multihop wireless network. Meanwhile, it may be configured that the supervisory node 11 transfers measurement data collected in a controller, not shown, and the controller calculates control data for operating and controlling a control instrument such as a valve, regulating valve, and so forth, not shown, in order to converge the measurement data in a prescribed target value, and operates and controls the control instrument based on the control data.

Meanwhile, group IDs are set or assigned beforehand to the gateway nodes 21 to 25 and wireless nodes 31 to 37, and the group IDs are stored respectively in group ID storage sections. For example, as shown in FIG. 1, a group ID "A" is assigned to the gateway node 22, gateway node 24, wireless node 33 and wireless node 35, while a group ID "B" is assigned to the gateway node 21, gateway node 25, wireless node 31, wireless node 34 and wireless node 36, and a group ID "C" is assigned to the gateway node 23, wireless node 32 and wireless node 37. Each group ID is stored in each group ID storage section of each node. Further, in FIG. 1, an instrument to which the group ID "A" is assigned is represented by circle "○", an instrument to which the group ID "B" is assigned is represented by square "□", and an instrument to which the group ID "C" is assigned is represented by triangle "Δ".

Figure 2:
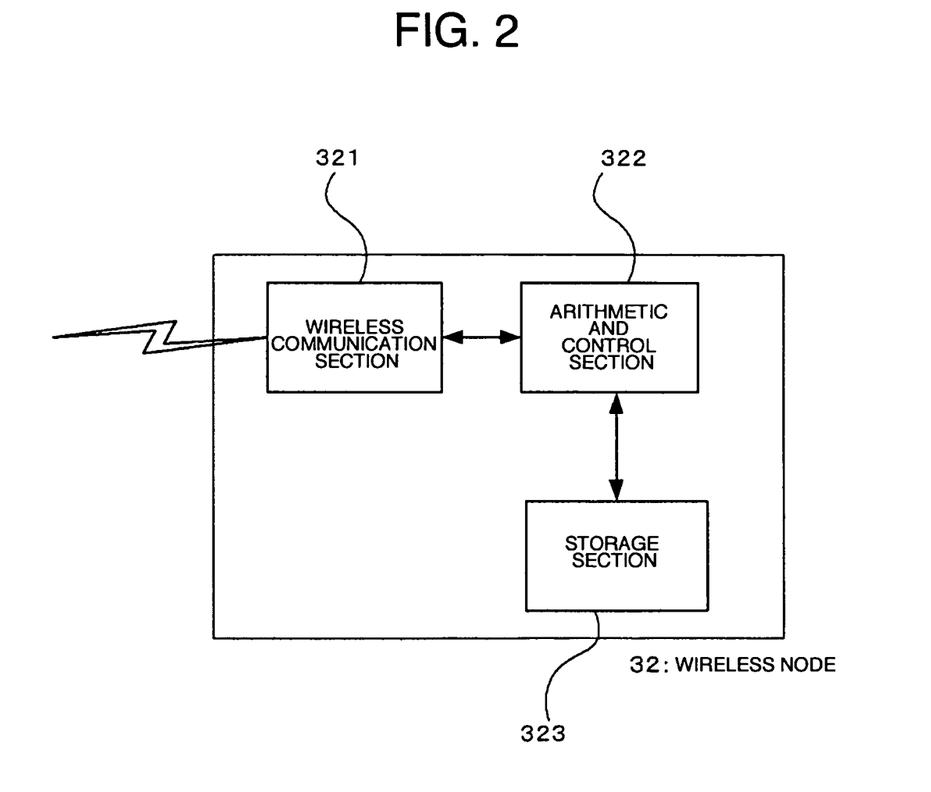
FIG. 2 is a block diagram showing a configuration of an example of a wireless node 32 in FIG. 1.

FIG. 2 is a block diagram showing a configuration of an example of the wireless node 32 in FIG. 1. In FIG. 2, a wireless communication section 321 is connected to an arithmetic and control section 322, and the arithmetic and control section 322 is connected to a storage section 323. The wireless communication section 321 implements wireless communication mainly between itself and other wireless nodes and gateway nodes. The arithmetic and control section 322 controls operations of each section. There are stored in the storage section 323 a program for operating the wireless node, route information leading from a self-node to the gateway nodes 21 to 25, route cost information, group ID of the self-node, group IDs of each gateway node, and so forth. The wireless nodes 31, 33 to 37 have the same configurations as that of the wireless node 32.

Meanwhile, it is sufficient that at least an address of the next hop such as IP addresses of the wireless nodes and gateway nodes, and a final address serving as the IP address of the gateway are stored as the route information in the route information storage section 323, and the route information and route cost information may be related with each other.

Further, the route cost information is an index representing a communication quality of the entire route leading from a source of data to a destination of data, and it may be, for example, the number of hop, integration value of radio field intensity as received, bit error rate, position information (using GPS, three point measurement and so forth), and so forth.

Figure 3:
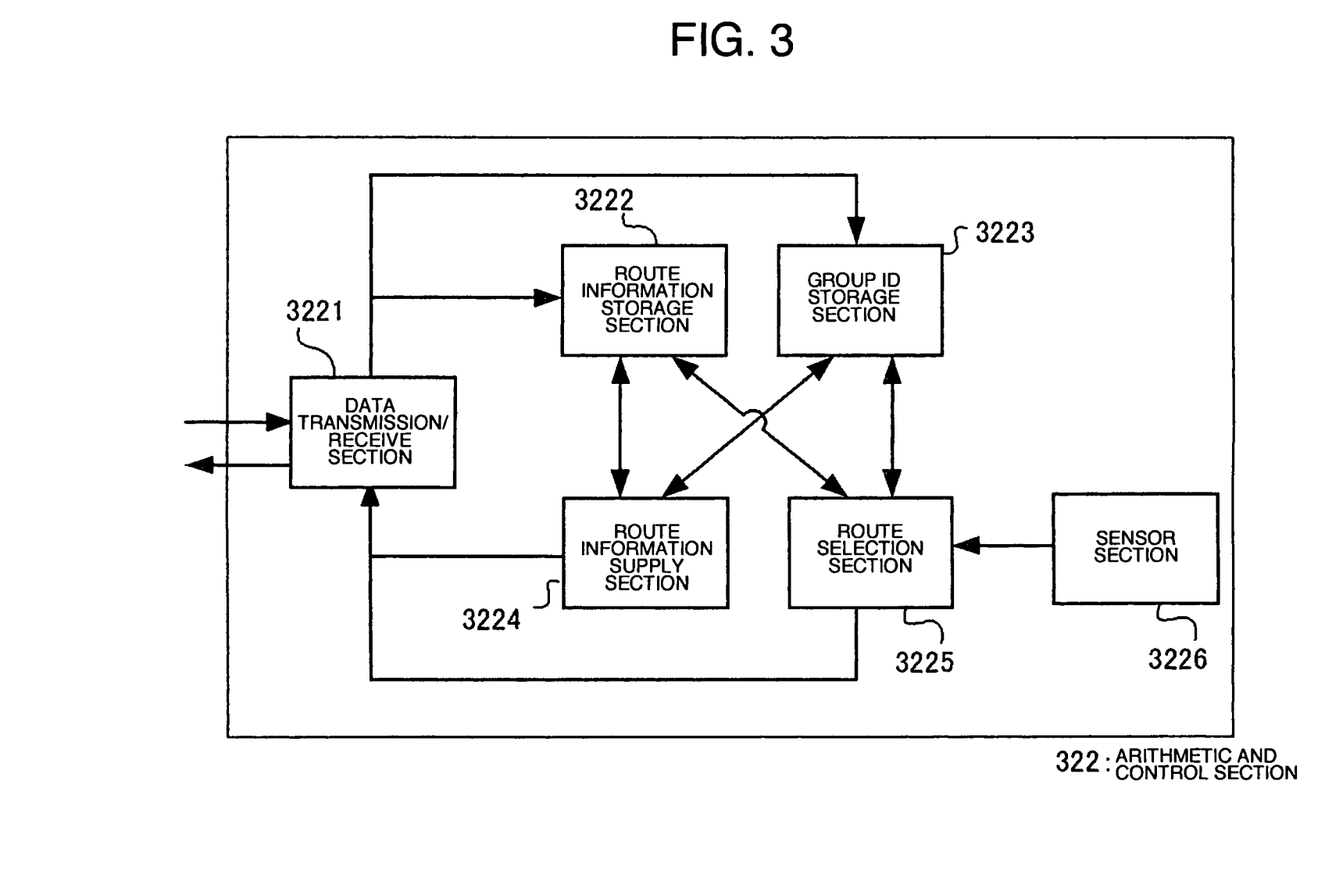
FIG. 3 is a block diagram showing an example of a function of an arithmetic and control section 322 constituting the wireless node 32 in FIG. 2.

FIG. 3 is a block diagram showing an example of a function of the arithmetic and control section 322 constituting the wireless node 32 in FIG. 2. A data transmission/receive section 3221 generates mainly a data frame and implements transmission/receive of data. A route information storage section 3222 stores therein mainly an address of next hop, route information leading to each gateway node, route cost information, and so forth. A group ID storage section 3223 stores therein manly a group ID of the self-node, group IDs of other wireless nodes and gateway nodes. A route information supply section 3224 notifies network information such as installing places, addresses of the self-node and other wireless nodes to other wireless nodes. A route selection section 3225 selects an optimum route for transferring measurement data to the supervisory node 11 based on route information and route cost information stored in the route information storage section 3222, and the group IDs stored in the group ID storage section 3223. A sensor section 3226 measures physical quantity such as a flow rate, temperature, and so forth by controlling a sensor, not shown.

Figure 4:
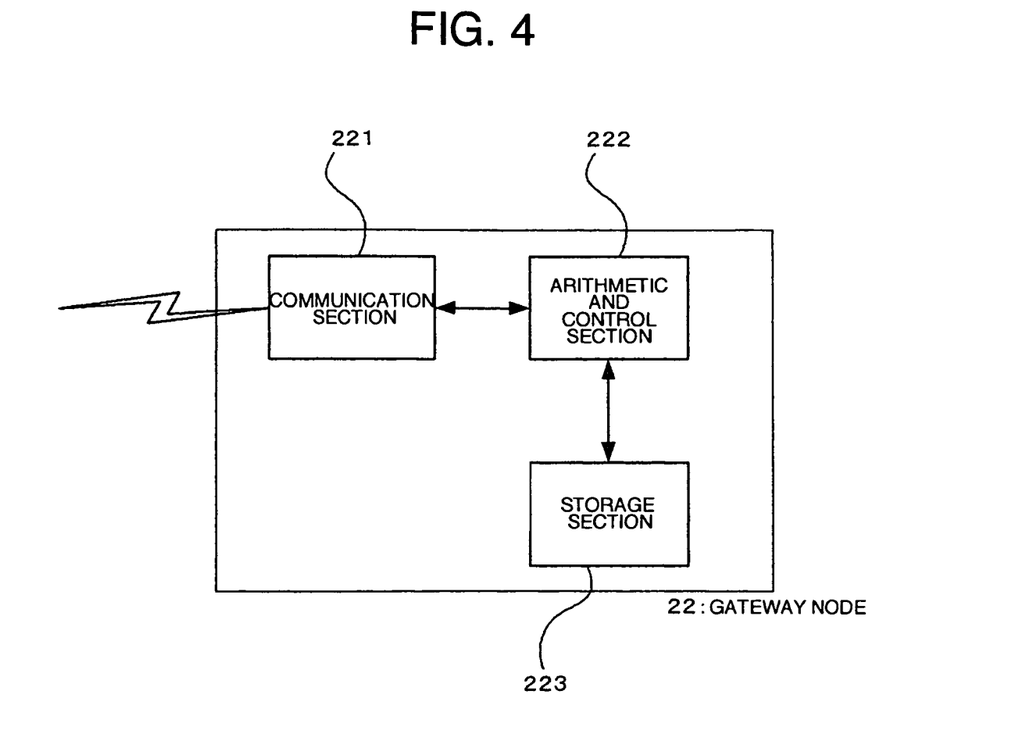
FIG. 4 is a block diagram showing a configuration of an example of a gateway node 22 in FIG. 1.

FIG. 4 is a block diagram showing a configuration of an example of the gateway node 22 in FIG. 1. In FIG. 4, a communication section 221 is connected to an arithmetic and control section 222, and the arithmetic and control section 222 is connected to a storage section 223. The communication section 221 implements communication mainly between itself and other wireless nodes, other gateway nodes, and the supervisory node 11. The arithmetic and control section 222 controls operations of each section. There are stored in the storage section 223 mainly a program for operating the gateway node, route information leading from self-node to the supervisory node 11, and so forth. The gateway nodes 21, 23 to 25 have the same configurations as that of the gateway node 22.

Figure 5:
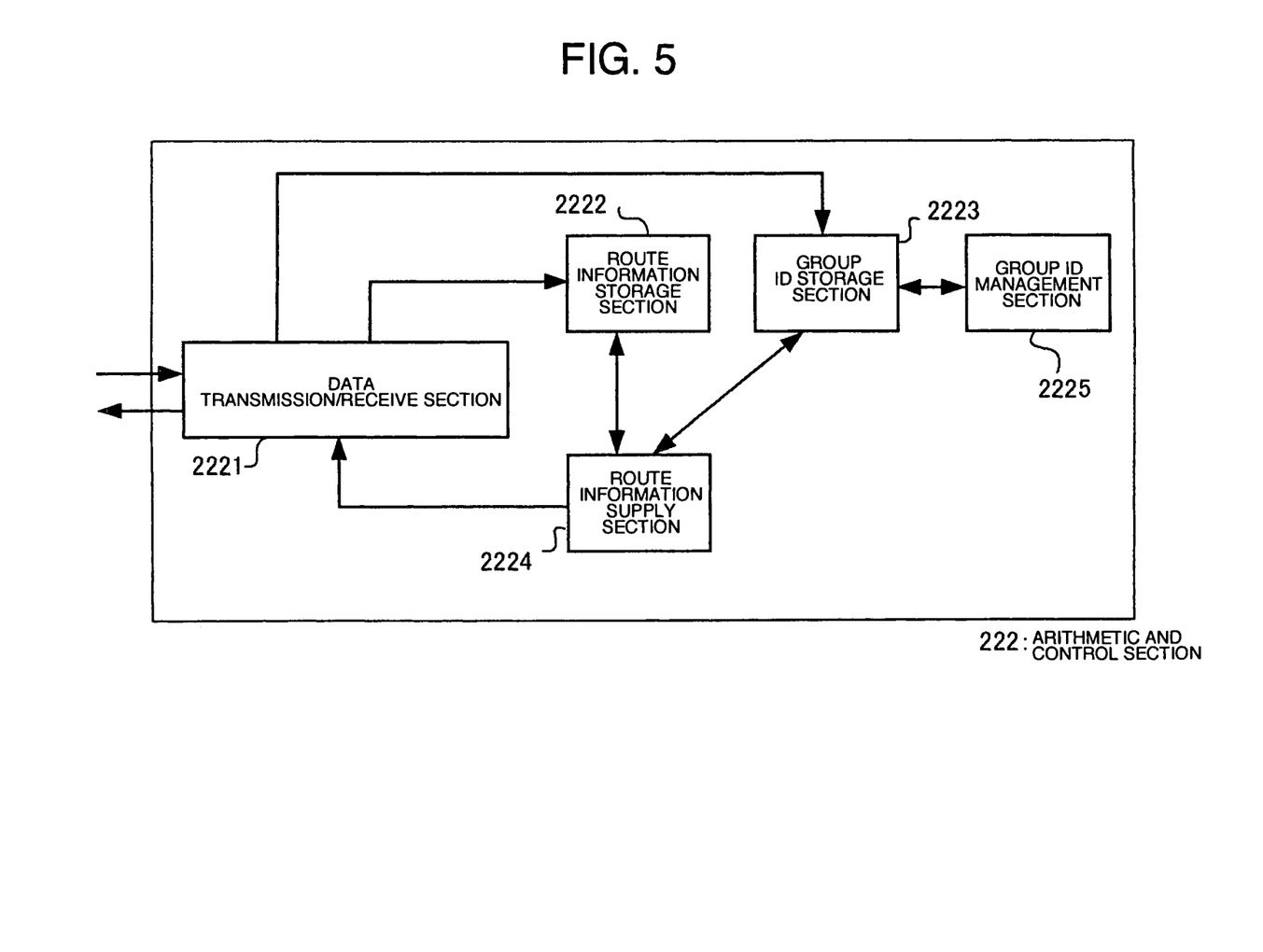
FIG. 5 is a block diagram showing a configuration of a function of an arithmetic and control section 222 constituting the gateway node 22 in FIG. 4.

FIG. 5 is a block diagram showing an example of a function of the arithmetic and control section 222 constituting the gateway node 22 in FIG. 4. A data transmission/receive section 2221 generates mainly a data frame and implements transmission/receive of data. A route information storage section 2222 stores therein mainly route information leading from the self-node to the supervisory node, and so forth. A group ID storage section 2223 stores therein mainly a group ID of the self-node, group IDs of each wireless node and other gateway nodes and so forth. A route information supply section 2224 notifies network information such as installing places, addresses of the gateway nodes, and so forth to other wireless nodes. A group ID management section 2225 implements change/management of group IDs stored in the group ID storage section 2223.

Figure 6:
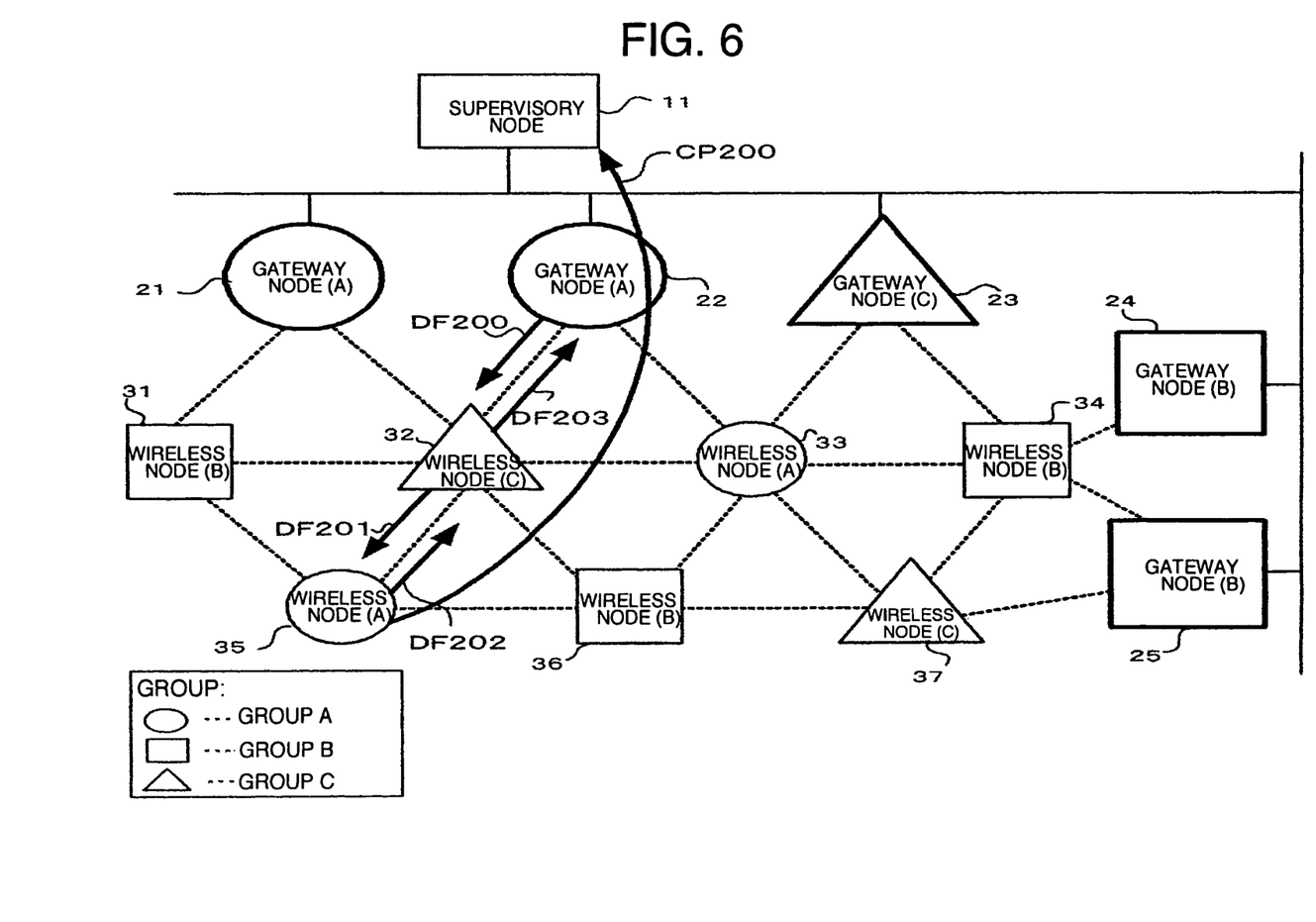
FIG. 6 is an explanation view for showing the flow of data communication.
Figure 7:
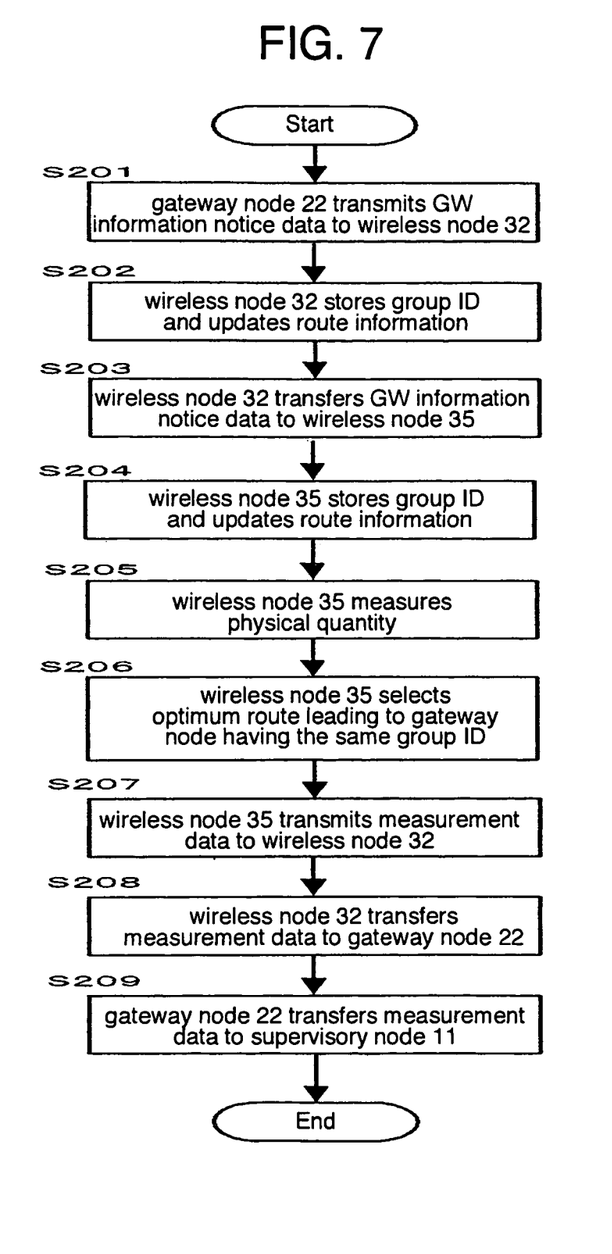
FIG. 7 is a flow chart for explaining an operation of the wireless control system according to the invention.

An operation of the wireless control system of the invention is described with reference to FIG. 6 showing the flow of data communication and FIG. 7 showing a flow chart. Meanwhile, it is supposed that the wireless nodes 31 to 37 grasp in advance route information for transferring data to the gateway nodes 21 to 25 via each wireless node, route cost information thereof, address of next hop and so forth by implementing address/name resolution and searching a route or setting route information in advance on each wireless node.

In FIG. 6, a data communication DF200 shows the flow of data transmission from the gateway node 22 to the wireless node 32, and a data communication DF201 shows the flow of data transmission from the wireless node 32 to the wireless node 35, while a data communication DF202 shows the flow of data transmission from the wireless node 35 to the wireless node 32, a data communication DF203 shows the flow of data transmission from the wireless node 32 to the gateway node 22, and a communication route CP200 shows the flow for data reaching the supervisory node 11 from the wireless node 35 via the wireless node 32 and gateway node 22.

First, in step S201 in FIG. 7, when the arithmetic and control section 222 of the gateway node 22 reads and executes the program stored in the storage section 223, the route information supply section 2224 of the arithmetic and control section 222 controls the data transmission/receive section 2221, and transmits "gateway information notice data" (hereinafter referred to as "GW information notice data"), which is acquired by adding thereto the group ID information of the gateway node 22 (e.g. the group ID "A") and address information of the gateway nodes, to each wireless node connected to the self-node. The gateway node 22 transmits the GW information notice data to the wireless node 32, for example, as shown in the flow of data communication DF 200 in FIG. 6. Meanwhile, it may be configured that the gateway node 22 transmits the GW information notice data not only to the wireless node 32 but to all the wireless nodes, i.e. to the wireless node 33.

In step S202, the arithmetic and control section 322 of the wireless node 32 reads and executes the program stored in the storage section 323 so that the group ID of the gateway node 22 is stored in the group ID storage section 3223 of the arithmetic and control section 322 based on the GW information notice data acquired from the gateway node 22, and address information of the gateway node 22 and so forth are stored in the route information storage section 3222. The operation of the arithmetic and control section 322 of the wireless node 32 to read and execute the program stored in the storage section 323 to control each section is also applied to other wireless nodes, and hence the operations of those of the other wireless nodes are omitted.

In step S203, the route information supply section 3224 of the arithmetic and control section 322 of the wireless node 32 controls the data transmission/receive section 3221 to transfer the GW information notice data acquired from the gateway node 22 to the wireless node 35. For example, as shown in the flow of the data communication DF201 in FIG. 6, the wireless node 32 transfers the GW information notice data to the wireless node 35. Meanwhile, it may be configured that the wireless node 32 transfers the GW information notice data not only to the wireless node 35 but also to all the wireless nodes connected thereto, namely, to the wireless nodes 31, 33 and 36.

Further, when each wireless node forms a multihop wireless network, it may be configured that each wireless node establishes wires communication with neighboring wireless nodes, stores therein the GW information notice data from neighboring wireless nodes, gateway nodes and transfers the GW information notice data to other wireless nodes.

In step S204, an arithmetic and control section, not shown, of the wireless node 35 stores therein the group ID of the gateway node 22 in a group ID storage section, not shown, and stores therein address information of the gateway node 22 and so forth in a route information storage section, not shown, based on the GW information notice data received from the wireless node 32.

In step S205, an arithmetic and control section, not shown, of the wireless node 35, reads and executes a program stored in a storage section, not shown, so that it controls a sensor section to measure physical quantity such as a flow rate, temperature and so forth and stores therein measurement data in a storage section.

In step S206, a route selection section of the arithmetic and control section of the wireless node 35 selects a route having the most excellent communication quality of routes leading to the supervisory node 11 via gateway nodes having the same group ID as a self-node based on group ID stored in a group ID storage section, route information and route cost information stored in a route information storage section. For example, the route selection section of the wireless node 35 selects a route having the most excellent communication quality of the routes leading to the gateway nodes 21,22 having the same group ID "A" as the group ID "A" of the wireless node 35 (for example, a route leading to the supervisory node 11 via the wireless node 32, gateway node 22 shown in the flow of the communication route CP200 in FIG. 6).

In step S207, a data transmission/receive section of the arithmetic and control section of the wireless node 35 transmits measurement data to the wireless node 32 based on the route selected by the route selection section and route information stored in the route information storage section. The wireless node 35 transmits measurement data to the wireless node 32, for example, as shown in the flow of the data communication DF202 in FIG. 6.

It may be configured that the data transmission/receive section of the wireless node 35 adds "route information" selected by the route selection section, an IP address of the gateway node that is a final address, group ID of the gateway node, and so forth to the measurement data and transmits it to the wireless node 32.

In step S208, the data transmission/receive section of the arithmetic and control section of the wireless node 32 selects a route having the most excellent communication quality of the routes leading to the gateway nodes having the same group ID as the wireless node 35 based on the measurement data and route information acquired from the wireless node 35, and transmits the measurement data acquired from the wireless node 35 to the gateway node 22. The wireless node 32 transmits measurement data to the gateway node 22, for example, as shown in the flow of the data communication DF203 in FIG. 6.

It may be configured that the wireless node 32 transfers the measurement data to the gateway node 22 based on gateway information and route information which are added to the measurement data.

In step S209, the data transmission/receive section 2221 of the arithmetic and control section 222 of the gateway node 22 transfers the measurement data received from the wireless node 32, i.e., data measured by the wireless node 35 to the supervisory node 11 via the network NW200 based on the route information stored in the route information storage section 2222.

Figure 8:
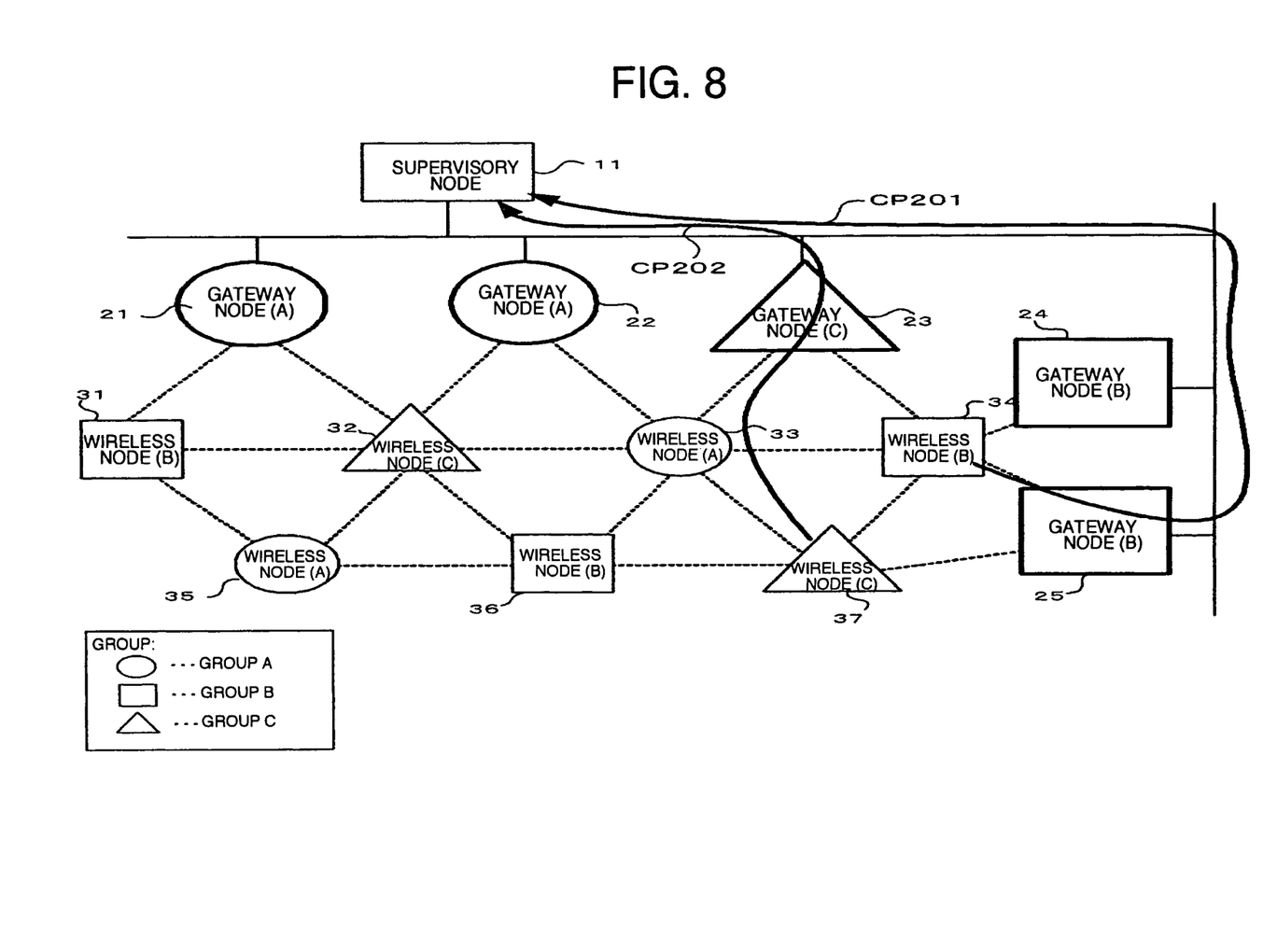
FIG. 8 is an explanation view showing the flow of data communication.

Described now is operations of the wireless nodes 34 and 37 when they transmit measurement data with reference to the explanation view showing the flow of data communication in FIG. 8. It is supposed that the wireless nodes 31 to 37 grasp in advance group IDs of the gateway node 21 to 25, route information for transferring data to the supervisory node 11, next hop address, route cost information, and so forth.

In FIG. 8, a communication route CP201 shows the flow of data from the wireless node 34 to the supervisory node 11 via the gateway node 25, and a communication route CP202 shows the flow of data from the wireless node 37 to the supervisory node 11 via the wireless node 33 and gateway node 23.

A route selection section of an arithmetic and control section of the wireless node 34 selects a route having the most excellent communication quality of routes leading to the supervisory node 11 via the gateway node 25 having the same group ID "B" as a self-node based on group ID stored in a group ID storage section, route information stored in a route information storage section and route cost information, and transmits the measurement data to the selected route. The wireless node 34 selects a route leading to the supervisory node 11 via the gateway node 25, for example, as shown in the communication route CP201 in FIG. 8 and transmits the measurement data to the selected route.

Likewise, a route selection section of an arithmetic and control section of the wireless node 37 selects a route having the most excellent communication quality of routes leading to the supervisory node 11 via the gateway node 23 having the same group ID "C as a self-node based on group ID stored in a group ID storage section, route information stored in a route information storage section and route cost information, and transmits the measurement data to the selected route. The wireless node 37 selects a route leading from the wireless node 37 to the supervisory node 11 via the wireless node 33 and gateway node 23, for example, as shown in the communication route CP202 in FIG. 8 and transmits the measurement data to the selected route.

As a result, each gateway node transmits the GW information notice data including gateway information such as group ID, IP address and so forth to each wireless node, and each wireless node stores therein the group ID, IP address and so forth of each gateway based on the GW information notice data, and transfers the GW information notice data to each wireless node, whereby each wireless node selects a route having the most excellent communication quality of the routes leading to the gateway nodes having the same group ID as the self-node and transmits the measurement data to the selected route, thereby reducing loads on the wireless network and gateway node, to improve reliability of the system.

Further, according to the wireless control system of the invention, since each gateway node transmits the GW information notice data to each wireless node, and each wireless node stores therein the GW information notice data and transfers it to each wireless node, even in the case where the wireless node or gateway node is removed or newly installed, the gateway node and the wireless node can be related with each other with ease by the group IDs.

That is, since the gateway node and wireless node can be related with each other with ease by the group IDs, the wireless node and gateway node can be more flexibly removed or newly installed.

Since the gateway node and wireless node can be related with each other by the group IDs, a plurality of gateway nodes can be disposed with ease. Further, as a result of disposition of a plurality of gateway nodes, a route leading from the wireless node to the supervisory node via the gateway nodes is rendered redundant, thereby improving reliability of the system.

This is because a plurality of gateway nodes and supervisory node are connected mutually to each other through a wired network, the route leading from the gateway node to the supervisory node does not influence the performance of the entire system so that if a plurality of the gateway nodes are disposed, the route leading from the wireless node to the supervisory node 11 is rendered redundant.

Further, since each wireless node selects a route having an excellent communication quality of the routes leading from the wireless node to the gateway node based on rout cost information, the number of hop is reduced and communication efficiency is improved, so that the load on the wireless node serving as a relay point is dispersed and the number of transmission and reception of the radio wave is reduced, thereby enhancing power saving of each wireless node.

Meanwhile, in the foregoing embodiment, the wireless control system is explained as an example for supporting the operation of the plant in the industrial automation, but the wireless control system is not limited thereto. For example, the wireless control system may support the operations of a control system of a water treatment plant in a factory automation, an air conditioning/lighting system in buildings.

For example, provided that wireless nodes are formed of lighting, switches and so forth in the building automation system, there are many obstacles such as instruments, furniture and fixtures, and so forth in the building where the wireless nodes are installed, radio disturbance is liable to occur. Accordingly, each gateway node transmits the GW information notice data including gateway information such as group ID, address information and so forth to each wireless node, and each wireless node stores therein this GW information notice data and transfers it to each wireless node, selects a route having an excellent communication quality of the routes leading to the gateway nodes having the same group ID as the self-node, and transmits the measurement data to the selected route, thereby reducing the loads on the wireless network and gateway nodes to improve reliability of the system.

Further, even in the case where a wireless node for transmitting data such as alarm which requires urgency and has high level of priority according to the invention is installed, data transmission can be implemented considering urgency and priority without increasing loads on the network and gateways according to the wireless control system of the invention.

In such a case, since each wireless node grasps group ID of the gateway node and so forth based on the GW information notice data from the gateway node by changing the group ID of the existing gateway node into that dedicated for alarm data having high level of urgency or additionally installing new gateway node, selects a route having the most excellent communication quality of the routes leading to the gateway nodes having the same group ID as the self-node, and transmits the measurement data to the selected route so that data transmission can be implemented considering the urgency and priority without increasing loads on the network and wireless nodes.

Although the group IDs of the gateways 21 to 25 are set in advance according to the foregoing embodiment, they may be changed manually by an operator. For example, the operator inputs the group IDs via an input unit such as a mouse and a keyboard, and the group ID management section of the arithmetic and control section may change the group IDs based on input information.

Further, the group ID management section of the arithmetic and control section of the gateway node may change the group IDs based on setting information for setting the group IDs received via the network, or the group IDs may be automatically changed at a predetermined time.

According to the foregoing embodiment, although the route selection section of the arithmetic and control section of the wireless node selects a route having the most excellent communication quality of routes leading to the supervisory node 11 via a gateway node having the same group ID as self-node based on the group ID, route information and route cost information stored in the route information storage section, and transfers data to the selected route, it may be configured that the wireless node selects a plurality of routes sequentially from the routes having an excellent communication quality based on route information and route cost information, and transfers data to the selected routes. Further, it may be configured that the wireless node selects not less than one route of the routes leading to the gateway nodes having the same group ID as the self-node.

Further, although there is shown the wireless network made up by the wireless node 31 to 37 according to the foregoing embodiment, it may be configured that the wireless communication system employs IEEE802.15.4 which is a standard of wireless communication or it employs any standard provided that each wireless node 32 can transmit and receive data via the wireless circuit.

Still further, although each wireless node transfers the measurement data to other wireless nodes and gateway nodes according to the foregoing embodiment, it may be configured that each wireless node transfers the measurement data while adding address information of the gateway node serving as address thereto when implementing transfer of measurement data.

More still further, although the gateway nodes 21 to 25 transfer received measurement data to the supervisory node 11 based on route information according to the foregoing embodiment, it may be configured that each wireless node transfers the measurement data while adding address information of the supervisory node serving as final address thereto when implementing transfer of measurement data, and each gateway node transfers the measurement data to the supervisory node based on address information which was added to the received measurement data.

Yet further, according to the foregoing embodiment, although the route information storage sections of the wireless nodes 31 to 37 store therein mainly next hop address, route information leading to the next gateway node, route cost information and so forth, and the group ID storage sections store therein the group ID of the self-node and group IDs of other wireless nodes and gateway nodes, these storage sections do not particularly limit thereto, and it may be configured that each wireless node stores therein at least address of next hop, route information leading to each gateway, route cost information, the group ID of the self-node and group IDs of other wireless nodes and gateway nodes.

Yet still further, although each wireless node stores therein route cost information according to the foregoing embodiment, it may be configured that each wireless node measures a communication quality of wireless communication between respective wireless node and between the wireless node and gateway node sand transfers measured the communication quality to each wireless node, thereby mutually storing the received communication quality therein in the case where wireless communication is established together with neighboring wireless nodes when making up a multihop wireless network, so that each wireless node calculates route cost information leading from the source wireless node (e.g. calculate a communication quality between respective nodes) to the destination gateway node based on these communication quality.

Yet more still further, if each wireless node can grasp route cost information representing communication quality of the entire route leading from source of data to destination of data, it may be configured that each wireless node calculates route cost information based on position information of each wireless node, the number of hop leading to the final address, a cell life of each wireless node of each wireless node and so forth.

Further, although the wireless node 35 according to the foregoing embodiment transmits data to the supervisory node 11 via the wireless node 32, a method of searching a route leading from the self-node to the gateway node by the wireless node may be any route searching method or route relaying method, provided that data can reach the gateway.

Further, although the gateway nodes 21 to 25 and the wireless nodes 31 to 37 of the foregoing embodiment have the group IDs, each gateway node and each wireless node may have a plurality of group IDs. For example, the gateway nodes may have group IDs "A" and "B" while the wireless nodes may have group IDs "A" and "C".

Although the wireless control system according to the foregoing embodiment is configured by the supervisory node 11, the gateway nodes 21 to 25 and the wireless nodes 31 to 37, it may be made up by not less than one supervisory node, by not less than one gateway node and by not less than one wireless node.

Although a concrete configuration of the supervisory node 11 according to the foregoing embodiment is not shown, it may be configure by any structure provided that data can be collected from each gateway node. For example, it may be configured that the supervisory node 11 is made up by a communication section for implementing mainly communication between itself and gateway nodes, an arithmetic and control section for controlling operations of each section, a storage section for storing a program for operating the supervisory node, route information of data, route cost information and so forth, wherein the communication section is connected to the arithmetic and control section and the arithmetic and control section is connected to the storage section.

Although the supervisory node 11 and gateway nodes 21 to 25 in the wireless control system according to the foregoing embodiment implement communication with each other via the wired network, communication between the supervisory node and gateway nodes may be implemented via wireless communication or wired communication.

According to the invention, as explained in detail above, loads on wireless network and gateway nodes are reduced to realize the wireless control system having high reliability, and hence the wireless control system is preferable for supporting operations of a process control system in an industrial automation, a control system of a water treatment plant in a factory automation, an air conditioning/lighting system in buildings, and so forth.

What is claimed is:

1. A wireless control system for transmitting data from a plurality of wireless nodes constituting a wireless network to a supervisory node via gateway nodes, wherein:

said each gateway node and said each wireless node have group IDs assigned thereto in advance;

said each wireless node selects a route having the most excellent communication quality of routes leading to the gateway nodes having the same group identification (ID) as a self-node and transmits data to the selected route; and said each wireless node stores therein the group IDs of said each gateway node based on a gateway (GW) information notice data, and transmits the GW information notice data to other wireless nodes.

2. The wireless control system according to claim 1, wherein said each gateway node transmits GW information notice data including at least a group ID of the self-node to said each wireless node;

said each wireless node has route information leading from the self-node to said each gateway node and route cost information serving as an index representing communication quality leading from the self-node to a destination node, wherein said each wireless node selects a route having the most excellent communication quality of the routs leading to the gateway nodes having the same group ID as the self-node based on the group ID of the self-node, the GW information notice data, the route information and the route cost information, and transmits data to the gateway nodes or other wireless nodes.

3. The wireless control system according to claim 1, wherein said each wireless node selects a plurality of routs having an excellent communication quality of the routes leading to the gateway nodes having the same group ID as the self-node, and transmits data to the selected plurality of routes.

4. The wireless control system according to claim 1, wherein said each wireless node comprises:

a storage section for storing therein first route information leading from the self-node to said each gateway node, route cost information, and the group IDs of the self-node and said each gateway node;

a wireless communication section for implementing wireless communication; and a transmitter for transmitting the GW information notice data to other wireless nodes, storing at least the group IDs of said each gateway node in the storage section based on the GW information notice data, selecting a route having the most excellent communication quality of the routs leading to the gateway nodes having the same group ID as the self-node based on the route information, the route cost information and the GW information notice data, and transmitting data acquired from the self-node or data received from other wireless nodes based on the selected route to the gateway nodes or other wireless nodes.

5. The wireless control system according to claim 1, wherein said each gateway node comprises:

a storage section for storing therein a second route information leading from each wireless node to the supervisory node for collecting data from said each wireless node via said each gateway node and the group ID of the self-node;

a communication section for implementing data communication by at least either wireless communication or wired communication; and a transmitter for transmitting the GW information notice data to said each wireless node and transferring the data received from said each wireless node based on the second route information to the supervisory node.

* * * * *